United States Patent [19]

Burgess

[11] Patent Number: 5,022,585
[45] Date of Patent: Jun. 11, 1991

[54] AUTOMATIC CHEMIGATION

[75] Inventor: Donald A. Burgess, Shoreham, N.Y.

[73] Assignee: Automated Chemical Management, Inc., Shoreham, N.Y.

[21] Appl. No.: 297,373

[22] Filed: Jan. 17, 1989

[51] Int. Cl.5 .............................................. B05B 7/30
[52] U.S. Cl. ...................................... 239/70; 239/66; 239/310
[58] Field of Search .................... 239/66, 67, 70, 310, 239/63, 64, 10, 318, 308; 137/624.18, 624.2

[56] References Cited

U.S. PATENT DOCUMENTS

| | | | |
|---|---|---|---|
| 3,669,357 | 6/1972 | Overbey | 239/310 |
| 4,026,673 | 5/1977 | Russo . | |
| 4,456,176 | 6/1984 | Agius . | |
| 4,545,396 | 10/1985 | Miller et al. . | |
| 4,558,715 | 12/1985 | Walton et al. . | |
| 4,852,802 | 8/1989 | Iggulden et al. | 239/310 |
| 4,870,991 | 10/1989 | McMillan et al. | 239/310 |
| 4,895,303 | 1/1990 | Freyvogel | 239/70 |
| 4,917,304 | 4/1990 | Mazzei et al. | 239/70 |

Primary Examiner—Andres Kashnikow
Assistant Examiner—Christopher G. Trainor
Attorney, Agent, or Firm—Leonard Belkin

[57] ABSTRACT

Apparatus and method for automatically irrigating and fertilizing a plurality of zones in a lawn and other botanical systems. A conventional underground sprinkler system may be employed having a source of liquefied fertilizer to be inserted into the main water supply or any of the zonal lines when water is being delivered to one of the zones. A clock is used to establish a maximum duration of fertilizer delivery. Normalizing timers are employed to restrict the flow of fertilizer as a fraction of the maximum duration depending on which zone is being irrigated.

12 Claims, 3 Drawing Sheets

AUTOMATIC CHEMIGATION

BACKGROUND OF THE INVENTION

The present invention relates to an automatic chemigation system and more particularly to a biological system incorporating features for the systematic application of chemicals in small, controlled amounts at frequent intervals.

A typical irrigation system for a lawn involves an underground sprinkler network which sequentially supplies water to zones in which the lawn is divided. Such an arrangement makes it possible to control accurately the delivery of water, avoiding watering which is too little and which would result in the grass having a weak surface root network subject to burnout and the production of thatch. Thatch prevents the growth of the grass plant and encourages weed emergence. It also is possible to avoid over watering which would effectively drown the grass plant or give rise to mold and fungus formation.

In order to supply nourishment to the lawn, fertilization is required. Fertilizing, as in watering, can be overdone or insufficient for optimum plant health. In the case of undernourishment the grass plant is starved and becomes weak and subject to replacement or encroachment by other heartier plants, especially weeds. When the grass plants are over fed, they are capable of absorbing only a finite amount of nitrogen which is stored in the root system. Over feeding promotes rapid plant growth until the stored nitrogen is depleted and the plant becomes weak because there is insufficient nutrients to maintain its overgrowth.

In order to prevent this "feast and famine" cycle and to avoid the labor of fertilizing lesser amounts more often, slow release fertilizers have been developed. These are typically applied to the lawn three to five times each year.

Depending on climatic conditions, such as excessive rainfall or unseasonable drought conditions, the "slow release" fertilizers deliver something other than optimum nutrients to the grass plants. As there is no way to anticipate with any degree of accuracy future weather conditions, fertilizers are often applied in excess quantitites to offset potential dry spells. This may not seem harmful, because excessive nitrogen is stored to the limit of the plants ability and any remainder passes through into the water table. However, this tactic causes inappropriate rapid growth, while also polluting the water table with chemical fertilizers and is wasteful of nutrients and costly.

For the reasons given above existing systems and methods for the fertilization of or delivery of chemicals to lawns and other botanical systems do not produce optimum results and have the drawbacks noted above.

Fertilization systems are shown in U.S. Pat. Nos. 4,026,673, 4,456,176, 4,545,396, and 4,558,715. None of the foregoing patents teaches or suggests the present invention.

SUMMARY OF THE INVENTION

In this invention there is provided a method and apparatus for incorporation into a water supply system a way to optimize the delivery of chemicals to lawns and other botanical and life systems by the controlled application of the chemicals in amounts and periods tailored to the needs of the plant or other living organism and climatic conditions. By so doing, the optimum growth rate and strength of the plants are obtained without waste or water table pollution.

In accordance with a preferred embodiment of this invention, there is provided an underground sprinkler system divided into zones with a water control to insure that for a certain period at regular intervals each zone in sequence is supplied with water. Incorporated into such a system is a reservoir of liquid fertilizer converted to supply the water main for the zones making up the system. A separate timer is provided to correspond with each zone so that fertilizer is delivered to the water main for a separately controllable duration within the period water is being delivered to each zone. In this way, control can be exercised to tailor the delivery of fertilizer or other chemical to each of the zones according to the separate needs of the zones and also adjustment of feeding can be made based on weather conditions independent of the delivery of water.

It is thus a principal object of this invention to provide method and apparatus for optimizing the delivery of chemicals to a lawn and other botanical irrigation systems.

Other objects and advantages of this invention will become obvious from the following detailed description of preferred embodiments of this invention.

BRIEF DESCRIPTION OF THE DRAWINGS

FIG. 2a shows a modification of the fertilizer feed shown in FIG. 2.

DETAILED DESCRIPTION OF THE PREFERRED EMBODIMENTS

Figure 1:
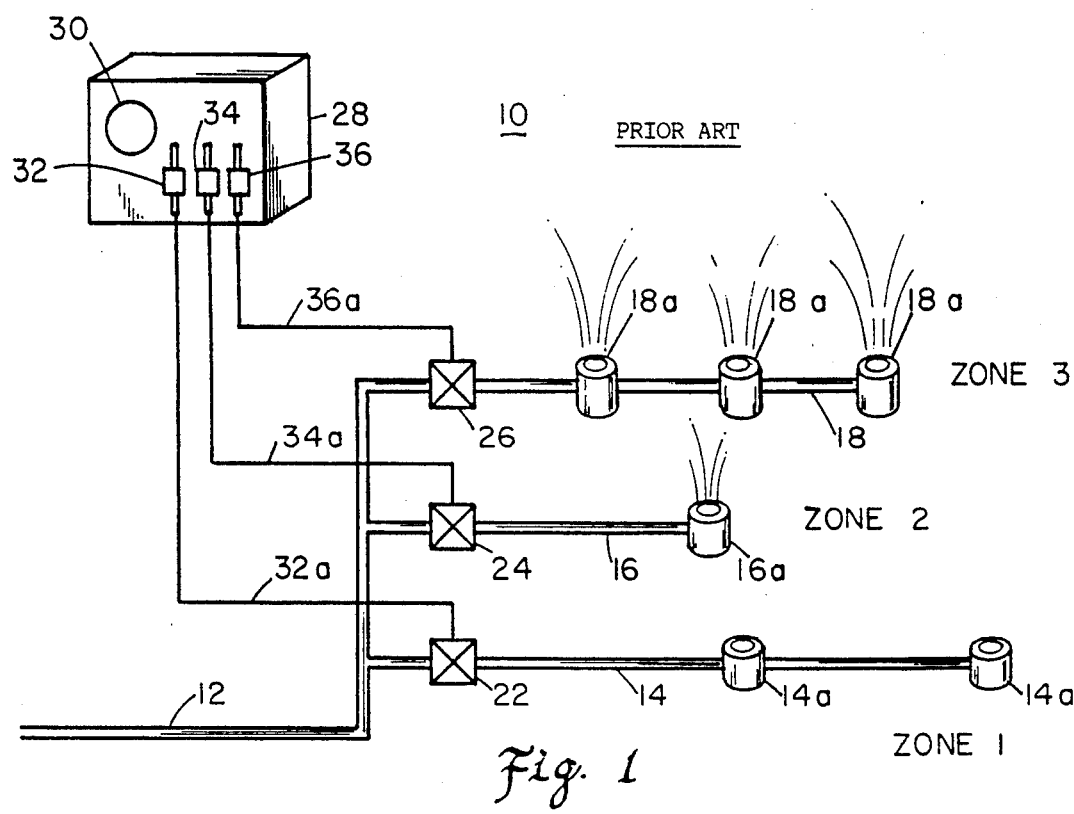
FIG. 1 is a schematic illustration of a conventional three zone lawn irrigation system.

Referring to FIG. 1, there is shown a conventional automatic sprinkling system 10 consisting of a water main 12 supplying water to headers or zonal supply lines 14, 16 and 18 delivering to zones 1, 2, and 3 as is understood in the art. Each of the headers is provided with sprinkler heads 14a, 16a and 18a, respectively, to deliver the water to the area covered by their repective zones. It is understood that the number and arrangement of the sprinkler heads in each of the zones may vary according to the size, shape and nature of the respective zones.

To control water delivery to the various headers and the sprinkler heads there is provided for each header solenoid control valves 22, 24, and 26, respectively, which are under the control of a master control unit 28 having a clock 30. Unit 28 is supplied with timers 32, 34, and 36 to regulate the opening and closing of each of the solenoid control valves 22, 24, and 26 in sequence through electrical lines 32a, 34a, and 36a, respectively. With the use of the timer 32, water can be delivered to zone 1 for a particular duration of time, once a day, for example, for distribution by sprinkler heads 14a. Similarly, zone 2 can be programmed to receive water after valve 22 is closed for a specific period of time set by timer 34, followed by zone 3 in sequence using timer 36.

In this way each zone can receive water in turn for its own specific period of time.

If nutrients or other chemicals such as weed killers were merely added to the water, then the amount delivered would be merely tailored to the volume of water without regard to other conditions, such as weather and the specific requirements of the individual zones, which may be essential to their needs.

Figure 2:
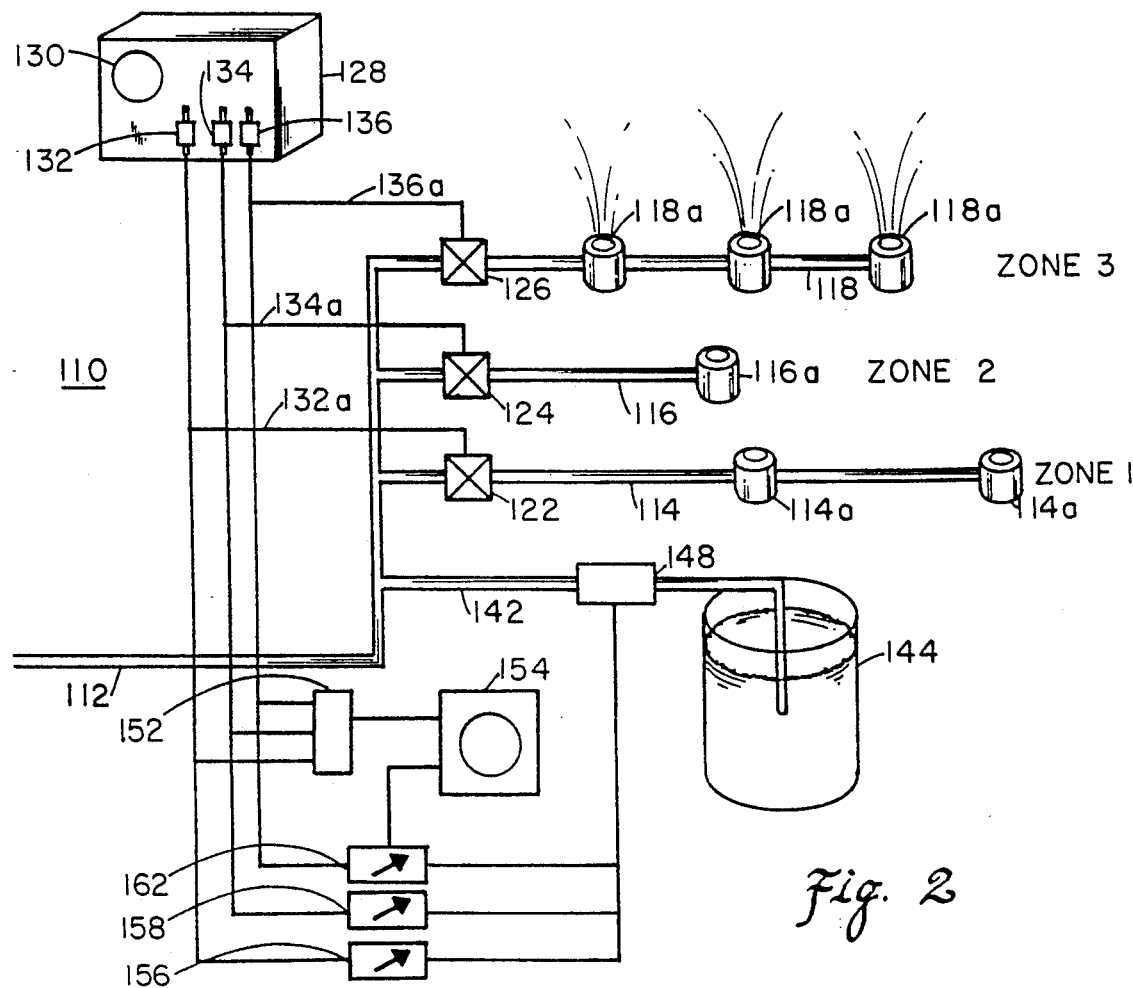
FIG. 2 is a schematic illustration of the system shown in FIG. 1 incorporating a preferred embodiment of this invention.

To carry out the principles of this invention, reference is made to FIG. 2 illustrating irrigation system 110 comprising a water main 112, headers or zonal supply lines 114, 116, and 118, having solenoid operated zone control valves 122, 124 and 126, and a master control unit 128 having a clock 130 corresponding to the irrigation system shown in FIG. 1. Each of headers 114, 116, and 118 is provided with sprinklers 114a, 116a, and 118a, respectively. Valves 122, 124, and 126 are under the control of timers 132, 134 and 136, through lines 132a, 134a and 136a, as previously described.

For the delivery of fertilizer or other chemical there is provided in water main 112 a line 142 which introduces the fertilizer from a reservoir 144 containing the fertilizer or chemical in liquid form. Line 142 contains a motor controlled pump 148 to deliver the fertilizer.

Connected to lines 132a, 134a and 136a through an OR gate 152 is a chemical control clock 154. Clock 154 will start to run when any one of timers 132, 134, or 136 opens its respective solenoid valve 122, 124 or 126. Another way of stating the preceding is the clock 154 will be functional when water is flowing through water main 112.

Clock 154 is presettable typically for periods from one minute to 60 minutes and would be activated or started from zero each time when one of the solenoid valves 122, 124 or 126 is activated by its respective timer 132, 134, or 136.

Connected to clock 154 and also to timer lines 132a, 134a, and 136a, respectively, are independently set timers, hereinafter referred to as normalizers, 156, 158 and 162, each of which produces an output to motor controlled pump 148.

Normalizers 156, 158 and 162 are timers which operate for some fraction of the system clock signal emanating from clock 154. That is, each of normalizers 156, 158 and 162 is calibrated from 0 to 100% and it is seen that they are logically ANDED with sprinkler solenoid control valves 122, 124, or 126 since they will be effective to actuate pump 148 only when one of the preceding valves is open, and only for the fraction of the duration selected on the respective normalizer 156, 158 or 162.

The system shown in FIG. 2 operates in the following manner.

At some time of the day, sprinkler system 110 begins a watering cycle by the preset operation of the sprinkler clock 130 and timers 132, 134 and 136. For illustration purposes, at a particular time, timer 136 is set to 30 minutes watering time and activates (opens) valve 126 supplying water from main 112, manifold 118 and out to the sprinkler heads 118a. At the beginning of the signal to valve 126, clock 154 is started by OR gate 152 and for this example is set for 2 minutes. Normalizer 162 is set for 100% and is activated by satisfaction of the AND condition of valve 126 and clock 154 to actuate pump 148 allowing the liquid fertilizer to enter the system and applied to a specific area (zone 3) of the lawn through manifold 118, valve 126 and sprinkler heads 118a.

Pump 148 remains operable for two minutes and then shuts down stopping any futher injection of fertilizer into the system during this cycle period. Valve 126 remains open continuing the watering cycle to the area serviced by sprinkler heads 118a.

At the end of the preset 30 minutes, valve 126 will close and valve 124 will open and, for this illustration, valve 124 will be set for 10 minutes by timer 134 because there are fewer sprinkler heads and presumably a smaller area is serviced through head 116a. Activation of valve 124 retriggers timer 154 for its two minute length of operation and satisfies the AND requirement of normalizer timer 158 which energizes pump 148 again, but this time because of the smaller area serviced by head 116a or perhaps because of the nature of the soil and natural nutrients, less fertilizer is required. The "normal" fertilizing time of two minutes is excessive in this situation, and the normalizing control is reduced to 40% in normalizer 158. Pump 148 in this case remains actuated supplying fertilizer through manifold 116, valve 124 and head 116a for only about 32 seconds (40% of two minutes), thereby avoiding over-feeding of this area. Valve 124 remains on for ten minutes continuing the watering cycle to the area serviced by head 116a.

At the end of this period, zone 1 will be activated through the opening of valve 122 and a watering period of 20 minutes selected by timer 132. Timer 154 is triggered once again to run for two minutes, normalizing valve 156 enabled and pump 148 is actuated as before, but in this case because of soil conditions, type of grass, amount of shade, etc. the "normal" feeding period is reduced to 50%. Pump 148 continues to operate for 1 minute supplying fertilizer through the manifold 114, valve 122 and heads 114a. Valve 122 remains open continuing the watering cycle for the full 20 minutes. Normalizers 156, 158 and 162 would be provided with dials to select the percentage selected.

Under some circumstances, instead of utilizing a pump for the delivery of fertilizer an aspiration system may be employed, as shown in FIG. 2a, as a modification of the arrangement shown in FIG. 2. Water main 112', corresponding to water main 112 in FIG. 2, is provided with an aspirator 172 which receives fertilizer from reservoir 144' through a tube 142' which is controlled by a solenoid operated on-off valve 174 which is energized by the operation of either of normalizers 156, 158 and 162 shown in FIG. 2. This arrangement is quite useful where it is desired to limit the use of electrical power or where large pressure variations or fluctuations alter the water volume.

While the system described above refers to the delivery of fertilizer any liquid chemical including weed killer for example or combination of ingredients may be employed.

Figure 3:
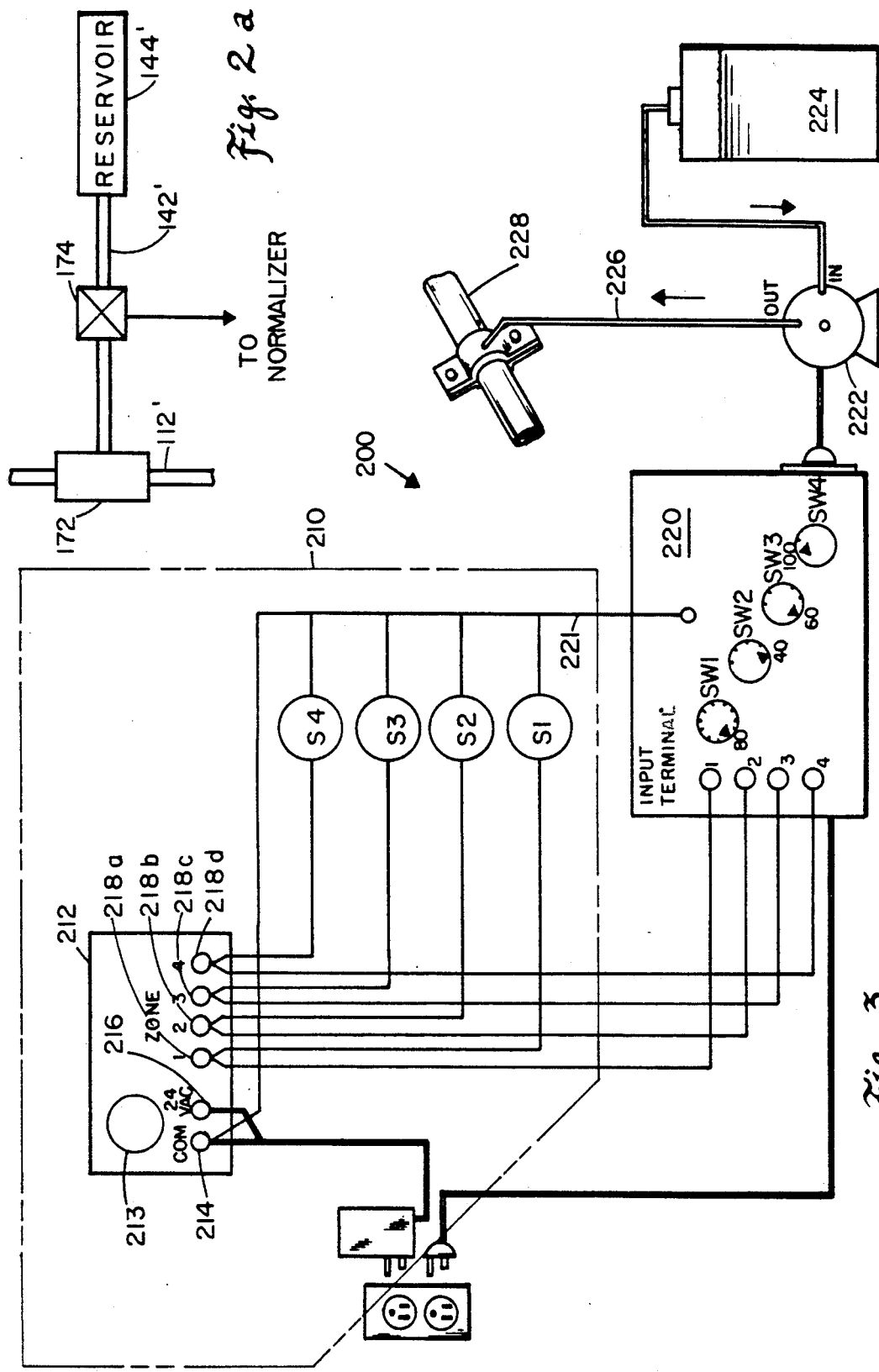
FIG. 3 is a schematic illustration of a system designed for four zones.

FIG. 3 shows an overall system 200 for a four zone irrigation configuration.

Conventional irrigation control 210 is shown in phantom which incorporates conventional master control unit 212 containing a clock 213 with a common (ground) connection 214, a 24 volt source 216 and individual timers 218a, 218b, 218c, and 218d for the four zones 1-4, each of which supplies corresponding inputs to fertilizer control unit 220 with terminal inputs 1, 2, 3, and 4 representing the inputs to normalizers corresponding to each zone as previously described, and through solenoids S1-S4 which control water flow into the respective zones not shown in this figure. From solenoids S1–S4 a line 221 indicates the state of a solenoid to the normalizers (not shown) within control unit 220. Motor pump 222 is energized when a normalizer is functioning to deliver fertilizer from reservoir 224 through a line 226 to water main 228 delivering water to the various zones.

Control unit 220 displays the dial faces SW1 to SW4 for the normalizers, respectively, for each of the four zones. As displayed, each dial can be adjusted from zero to 100%.

EXAMPLE

Figure 4:
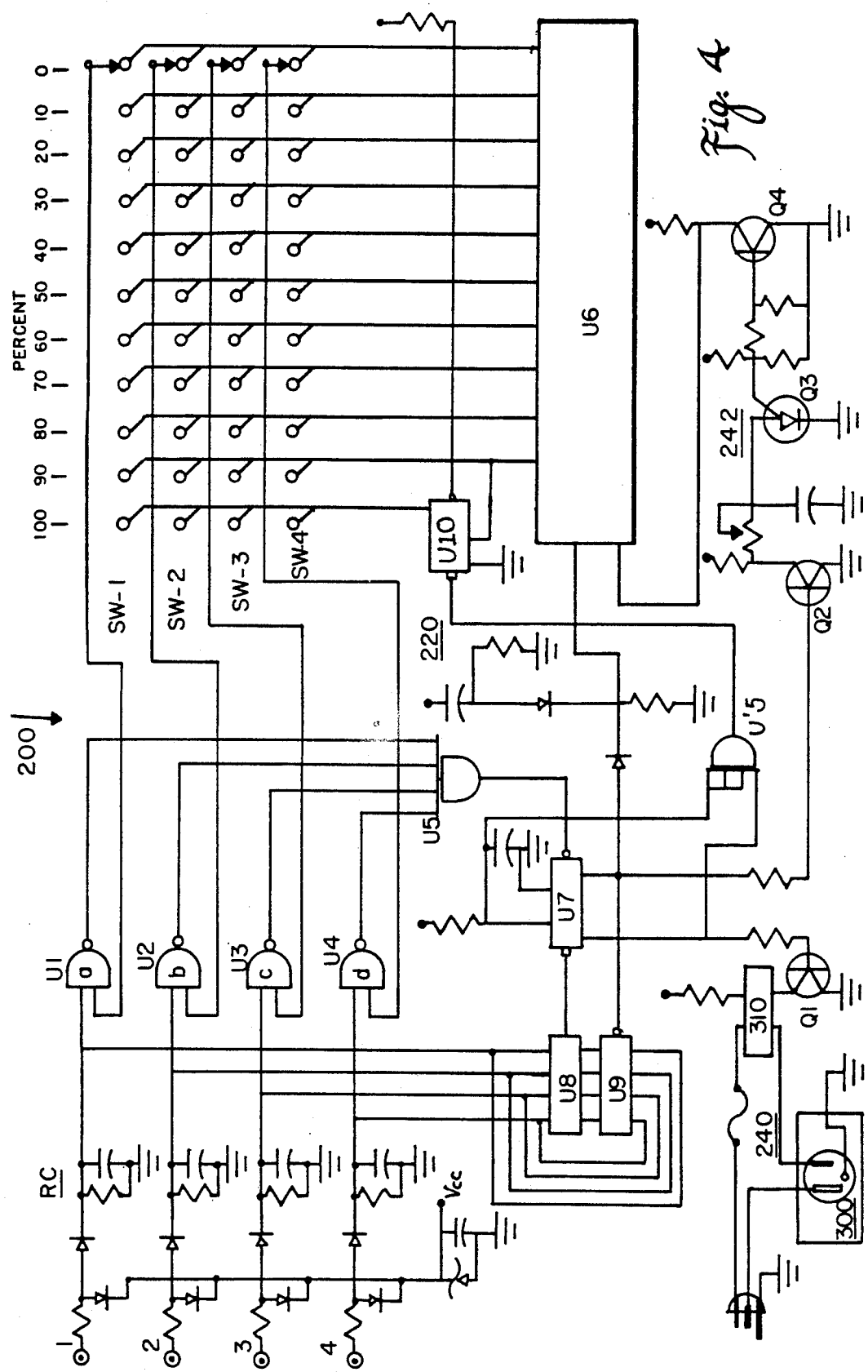
FIG. 4 is a schematic illustration of an example of this invention.

A specific example of the controller 220 used in FIG. 3 is illustrated in FIG. 4. In this example, a number of assumptions have been made and the circuit has been designed in keeping with those assumptions. For example, there is a typical pre-existing irrigation system of common type having four zones, but it is understood that any number can be accomodated with appropriate additional components.

The circuit is shown to activate a suitable pump using an A.C. motor 300 and provides isolation for the circuitry by using an opto-coupler 310.

The circuit shown requires no power of its own, getting what is needed by the operation of the irrigation valves. The circuit requires only a few milliamps to operate and does not constitute a noticable load to the irrigation system.

Input terminals 1-4 receive 24 volts from master control unit 212 and rectifier circuits RC reduce the voltage down to acceptable value such as 10 volts dc which are delivered to NAND gates U1-U4 and terminal Vcc which supplies power for the whole circuit. Normalizer switches SW1-SW4 provide the other input to the NAND gates U1-U4, respectively, as illustrated. Only one of the NAND gates U1 to U4 would deliver its output to AND (or negative OR) gate U5. Switches SW1 to SW5 are stepped from zero to 100% and receive their clock pulses from a decoded decade counter U6.

Gate U5 delivers its output to a flip flop U7 which also receives a signal from a four bit comparator U8. Gate U'5 is the other half of AND gate U5. A four bit latch U9 holds the signal from an input terminal so that comparator U8 will change the state of flip flop U7 only when the input has terminated.

Flip flop U7 will activate the pump driving circuit 240 which comprises opto isolator 310 which passes high voltage to motor 300 for the pump while isolating the high voltage from the rest of the circuit.

Flip flop U7 also initiates clock circuit 242 which sends its pulses to the decoded decade counter U6 the fraction of time selected by one of the switches SW1-SW4 and its associated NAND gate U1-U4. Flip flop U10 is activated at the end of the 90% position to provide the 100% duration.

The circuit shown in FIG. 4 is an example of only one circuit which can carry out the functions of the system shown in FIG. 3 and it is understood that many other circuits can be designed to accomplish the same result.

One of the advantages of the present invention is that it permits the use of highly concentrated forms of the chemical additive thereby reducing substantially the storage and/or space requirements.

Although the embodiments described relate to irrigation systems it can be readily seen that this invention can be utilized as part of a system to supply feed water and nutrients/chemicals to animals under cultivation.

While only certain preferred embodiments of this invention have been described it is understood that many variations are possible without departing from the principles of this invention. For example, the liquefied fertilizer may be inserted directly into the zonal supply lines rather than the main supply line. Thus the invention is defined in the claims which follow.

What is claimed is:

1. An arrangement for automatically introducing a chemical into a plurality of zones in a biological system comprising:
   a. a water supply system having a main water supply line, a plurality of headers for delivering water to each of said zones directly from said main supply line, normally closed on/off water flow valve means in each of said headers to permit upon actuation flow of water into the respective header, and timer means for each of said water flow valve means for actuating its respective water flow valve means at selected staggered intervals and for establishing a length of time each said water flow valve means is open to permit flow of water into its respective zone;
   b. a source of liquefied chemical for said biological system;
   c. means for delivering said chemical from said source into said system when water is flowing; and
   d. said delivering means including control means for controlling a maximum duration of delivery of chemicals to said system from said source and separate normalizing means for each of said headers for selectively establishing a fraction of said duration during which said chemical is delivered to each of said headers.

2. The apparatus of claim 1 in which said control means includes clock means initiated in response to opening of one of said water flow valve means to establish said maximum duration of delivery of chemicals to said system while water is being delivered to one of said headers.

3. An arrangement for automatically introducing a chemical into a plurality of zones in a biological system comprising:
   a. a water supply system having a main water supply line, a plurality of headers for delivering water to each of said zones directly from said main supply line, normally closed on/off water flow valve means in each of said headers to permit upon actuation flow of water into the respective header, and timer means for each of said water flow valve means for actuating its respective water flow valve means at selected staggered intervals and for establishing length of time each said water flow valve means is open to permit flow of water into its respective zone;
   b. a source of liquefied chemical for said biological system;
   c. means for delivering said chemical from said source into said system when water is flowing;
   d. said delivering means including control means for controlling a duration of delivery of chemicals to said system from said source, said control means including clock means initiated in response to opening of one of said water flow valve means to establish the maximum duration of delivery of chemicals to said system while water is being delivered to one of said headers, and e. normalizing timer means for each of said headers for selectively establishing a fraction of the maximum duration established by said clock means during which chemicals are delivered to one of said respective header.

4. The apparatus of claim 3 wherein each said normalizing timer means is actuated by the starting of said clock means and actuation of its said respective water flow valve means.

5. The apparatus of claim 4 wherein said delivery means comprises a pump to deliver said chemical to said system.

6. The apparatus of claim 4 wherein said delivery means comprises an aspirator in said system.

7. The apparatus of claim 5 wherein said water flow valve means are solenoid operated for on/off operation.

8. The apparatus of claim 6 wherein said water flow valve means are solenoid operated for on/off operation.

9. The method of automatically irrigating and introducing a chemical to a plurality of zones in a botanical system comprising the steps of:

a. supplying water from a main water supply line to a parallel arrangement of zonal water supply lines;

b. controlling selectively the time intervals and durations of delivery of water to each of said zonal supply lines;

c. supplying liquefied chemical to said main water supply line;

d. establishing a maximum duration for delivery of said chemical to main supply line; and e. limiting the duration of flow of chemical to a fraction of said maximum duration as a function of the zone to which water is being delivered.

10. The method of claim 9 in which said liquefied chemical is pumped into said main water supply line.

11. The method of claim 9 in which said liquefied chemical is aspirated into said main water supply line.

12. The method of claim 9 having clock means to establish said maximum duration of flow of said chemical, and the flow of chemical to each of said zones being set as a fraction of said maximum duration.

* * * * *